United States Patent [19]
Corpeny et al.

[11] Patent Number: 5,600,308
[45] Date of Patent: Feb. 4, 1997

[54] METHOD FOR DETECTING A POSITION ON A PRODUCT

[75] Inventors: Peter A. Corpeny; Mark D. Kelley, both of Kansas City, Mo.

[73] Assignee: Devro-Teepak, Inc., Westchester, Ill.

[21] Appl. No.: 493,975

[22] Filed: Jun. 23, 1995

[51] Int. Cl.$^6$ ................................. G08B 21/00
[52] U.S. Cl. ............................. 340/675; 452/31; 452/32; 452/35
[58] Field of Search .............................. 340/675; 452/31, 452/32, 35

[56] References Cited

U.S. PATENT DOCUMENTS 3,146,431  8/1964  Betts ....................... 340/675
5,399,213  3/1995  Oxley ....................... 452/31

Primary Examiner—Glen Swann
Attorney, Agent, or Firm—Michael L. Dunn

[57] ABSTRACT

A method for removing a splice at a location on a tubular food casing product applies a tape to the food casing proximate the position of the splice, which tape has metallic properties. At least one of the metallic properties is detected when the tape reaches a particular location during movement of the casing. The splice is removed in response to the detection of the tape. Apparatus for removing a splice from a tubular food casing product employs a detector for detecting the tape when the tape reaches a particular location during movement of the casing; and employs a casing cutting apparatus for removing the splice which is activated in response to detection of the tape.

5 Claims, 1 Drawing Sheet

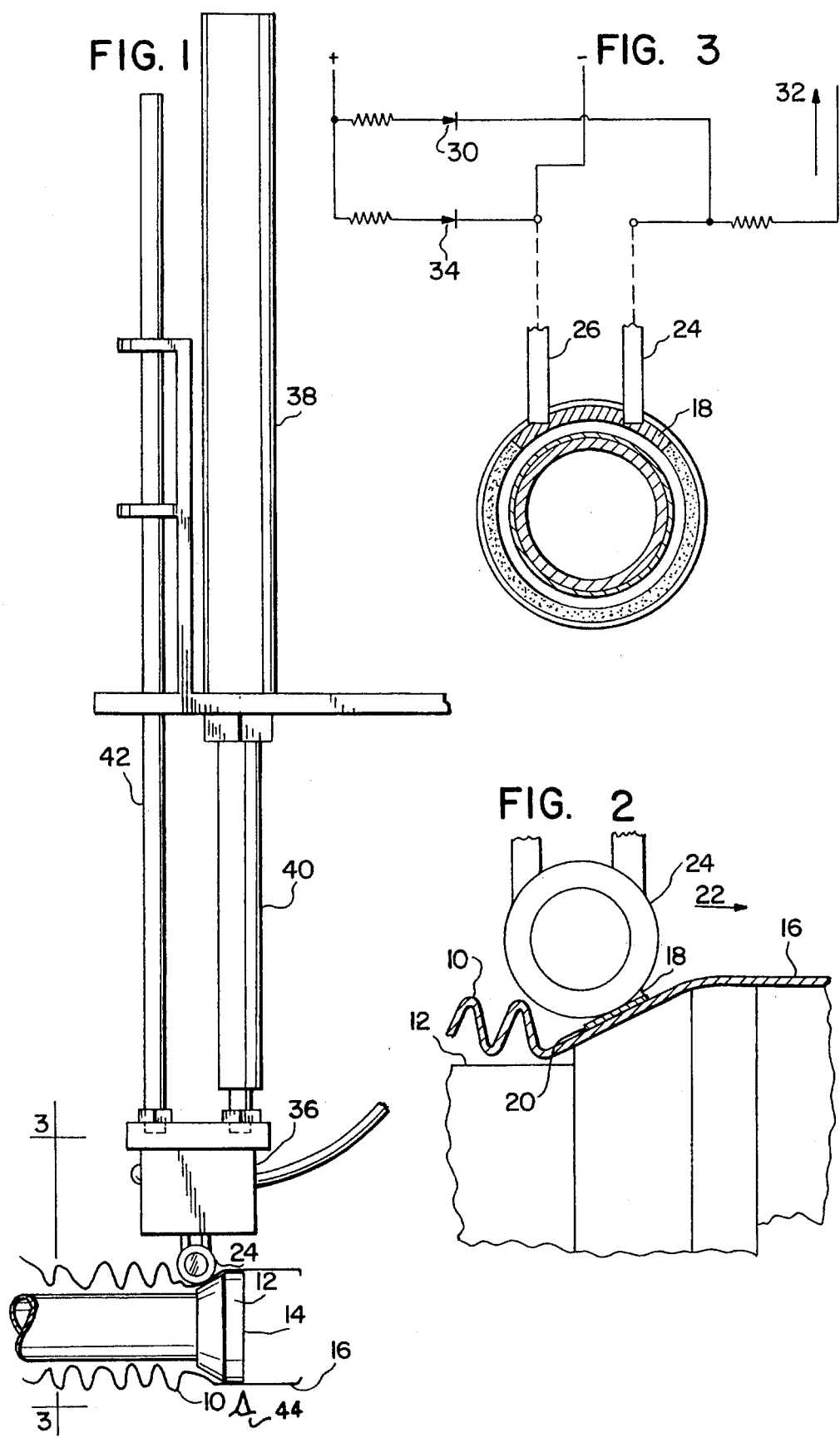

METHOD FOR DETECTING A POSITION ON A PRODUCT

BACKGROUND OF THE INVENTION

This invention relates to methods for detection of the position of an article or product during transport of the product such as in a manufacturing or handling operation.

In processes involving article transport, it is sometimes desirable to know the precise position of the article or a portion thereof for application of a particular process step. This is particularly desirable, for example, in the manufacture of tubular film for use as a food casing and in stuffing operations where the casing is filled with food product.

A particular example is the operation where a splice is to be removed in a food casing during a food stuffing operation. Food casings have finite lengths. It is therefore sometimes necessary to splice lengths of food casing together, for example for continuity during manufacturing. Such splices unfortunately interfere with food stuffing operations for various reasons including insufficient stretch to pass over a stuffing horn and because of unaesthetic appearance. It is therefore necessary to remove such splices prior to stuffing either by the casing manufacturer or later at the meat packing plant. Unfortunately, locating such splices during processing has been a manual procedure using costly manpower and slowing production time.

Further, a part of the reason that the splices have been manually removed is that it has been difficult to automatically locate the splices during movement of the food casing and visual location has been the only reliable method.

BRIEF DESCRIPTION OF THE DRAWINGS

FIG. 1 is a side elevational view of an apparatus of the invention for detecting a slice in a food casing.

FIG. 2 is a magnified view of a portion of FIG. 1 showing contact of an electrode with a metallic tape.

FIG. 3 is a front view of a preferred embodiment of an apparatus of the invention taken along line 3—3 of FIG. 1 showing a schematic of a detection circuit attached to the electrodes.

BRIEF DESCRIPTION OF THE INVENTION

The invention comprises a method for automatically detecting a position on a product when the position reaches a particular location during transport of the product. The method comprises applying a tape to the product at the desired position which tape has metallic properties and detecting at least one of said properties at the desired location. The invention further comprises an apparatus for practicing the method.

In one embodiment, the tape is electrically conductive and is detected by applying separated electrodes to the tape and detecting electrical conduction between the electrodes and in another embodiment the tape is magnetic and is detected by development of an electrical current in a coil as the tape passes the coil.

DETAILED DESCRIPTION OF THE INVENTION

"Detecting" means to sense the presence of the position on the product and providing a signal as a result of such sensing. The signal may, for example, be an indicator light or alarm or may be a signal applied to another device to initiate or stop a desired action such as a process step. Any suitable detector may be used, but is usually a pair of electrodes which cause a circuit to be completed when they simultaneously contact an electrically conductive tape. Such a detector may, for example, also be a detector for a magnetic property such as a coil which sets up an electrical current when a magnetic tape moves near it or may be a detector such as a magnetized needle which will change an electrical resistance when attracted by an unmagnetized tape which is attracted by a magnet. Photoelectric cells may also be used to detect light reflected from a metallically reflective tape.

"Automatically detecting" means that the tape is detected by other than visual observance of the tape.

"Product" for which the method and apparatus of the invention may be used, is essentially any product or article upon which a tape having metallic properties can be applied. Such a product may be a relatively small product which, during processing, is serially handled along with numerous other similar products. Such products may, for example, be packages of goods. The product may also be an essentially continuous product, such as a tubular material, which is in fact one product in various stages of production along an entire processing line.

"Position on a Product" means a particular place on a Product either to identify the specific Product as a whole or to identify the particular position. A position on a tubular casing, for example, would be a desired particular position, for example at the position of a splice to be removed.

"Location" means a desired location along an assembly or processing line.

"Transport" means to move the product along an assembly or processing line. Individual Products may be transported along a line sequentially where many such Products are on a single line, or the Product may extend through the entire line, as in the case of tubing manufacture.

"Tape" means a reinforced or unreinforced film or sheet which is applied to the product. The tape may be applied by any suitable means which is usually an adhesive. The adhesive may be a contact cement having tack properties or may be a glue which cures with time or heat.

"Metallic Properties" means properties of a metal which are particularly suitable for detection. Examples of such properties are electrical conductivity and for some metals, magnetic attraction and high reflectivity.

For a better understanding of the invention, reference may be had to the drawings for a description of a preferred embodiment of the invention.

As seen in FIG. 1, in a food stuffing machine, a food casing 10 is folded onto a stuffing horn 12. Food product from the stuffing horn 12 exits from stuffing horn 12 at end 14 and into deshirred casing 16. As seen in FIG. 2, metallic foil tape 18 is attached to a splice 20 in casing 10. As casing 10 moves in the direction of arrow 22, foil tape 18 will move under roller electrodes 24 and 26 (FIG. 3). When both electrodes contact metallic tape 28, a circuit is completed through light emitting diode 30 and a signal is sent to other indicators and devices responsive thereto in the direction of arrow 32. When the electrodes are activated, light emitting diode 34 is always on, whether or not electrodes 24 and 26 are in contact with tape 18. The foregoing circuit may be located in a circuit box 36. As seen in FIG. 1, electrode 24 may be withdrawn and engaged with casing 10 by means of pneumatic cylinder 38 and piston 40. To maintain stability and to prevent rotation of the electrode, cylinder guide 42 may be provided. Electrode 26 is similarly attached to a pneumatic cylinder and piston which co-acts with piston 40 and cylinder 38. As a result of the detection a signal may be generated which activates a cutting apparatus 44 to remove the splice 20.

What is claimed is:

1. A method for removing a splice at a location on a tubular food casing product which comprises:
   a) applying a tape to the food casing proximate the position of the splice, which tape has metallic properties;
   b) detecting at least one of said properties of the tape when the tape reaches a particular location during movement of the casing; and
   c) removing the splice in response to the detection of the tape.

2. The method of claim 1 wherein the tape is electrically conductive and is detected by applying separated electrodes to the tape and detecting electrical conduction between the electrodes.

3. The method of claim 1, wherein, as a result of the detection when the position reaches the location, a signal is generated which activates a casing cutting apparatus to remove the splice.

4. An apparatus for removing a splice from a tubular food casing product which comprises:
   a) means for detecting a tape which has metallic properties, applied to the product proximate the splice, when the tape reaches a particular location during movement of the casing; and
   b) a casing cutting apparatus for removing the splice which is activated in response to detection of the tape.

5. The apparatus of claim 4 wherein the tape is electrically conductive and the means for detecting comprises means for applying separated electrodes to the tape and means for detecting electrical conduction between the electrodes.

* * * * *